Figure 1:
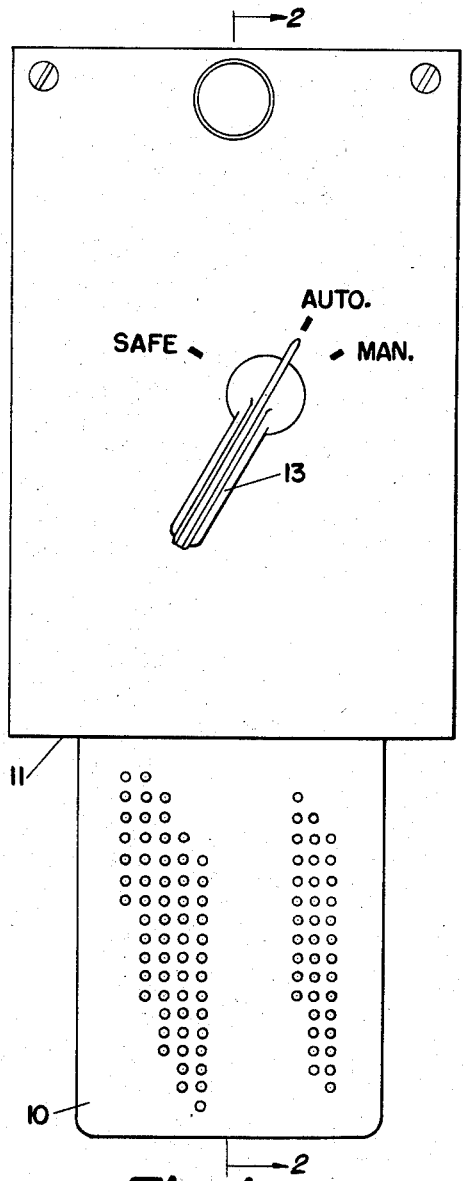

March 22, 1960     G. P. MILLER ET AL     2,929,936

ELECTRIC GENERATOR CONTROL MEANS

Filed March 28, 1958     3 Sheets-Sheet 1

INVENTORS
GEORGE P. MILLER
C WALTON MUSSER
BY
W. E. Thibodeau, J. J. Lynch & H. R. Johns

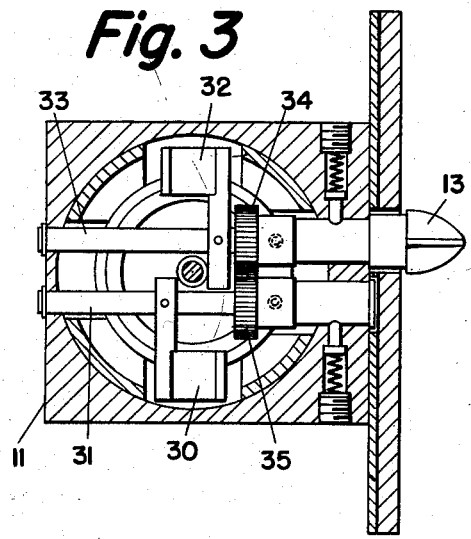
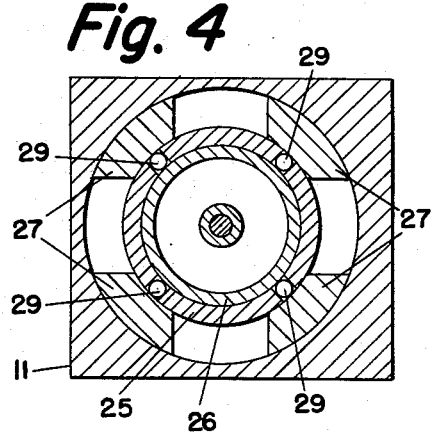
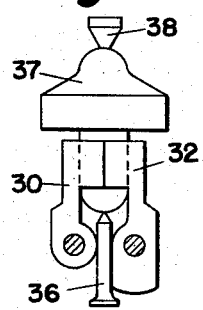
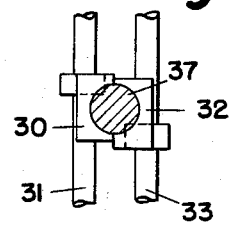
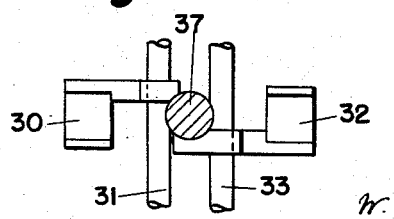
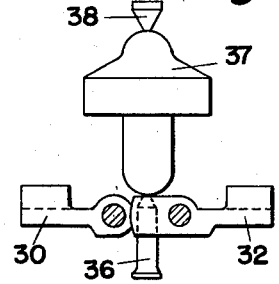

INVENTOR.
GEORGE P. MILLER
C WALTON MUSSER

United States Patent Office 2,929,936
Patented Mar. 22, 1960

2,929,936

ELECTRIC GENERATOR CONTROL MEANS

George P. Miller, Cornwells Heights, Pa., and C Walton Musser, Beverly, Mass., assignors to the United States of America as represented by the Secretary of the Army Application March 28, 1958, Serial No. 724,773

6 Claims. (Cl. 290—1)

(Granted under Title 35, U.S. Code (1952), sec. 266)

The invention described herein may be manufactured and used by or for the Government for governmental purposes without the payment of any royalty thereon.

This invention relates to means for controlling the operation of an electric generator having a support, such as an airplane, which is subject to a varying rate of deceleration. More particularly, it involves means for initiating operation of an electric generator in response to a predetermined abnormally high rate of deceleration such as would be produced by the airplane striking a tree, a pole, a tower or the like.

Insofar as applicants are aware, they are the first to provide a deceleration sensing device which (1) responds to an abnormally high rate of deceleration and (2) functions to initiate operation of an electric generator from which power is derived for effecting various safety measures aboard an airplane.

Possible uses of the invention are the actuation of safety switches to prevent fire, actuation of a catapult in the tail of the airplane for jettisoning certain objects or equipment and the like.

Our invention will be better understood from the following description considered in connection with the accompanying drawings and its scope is indicated by the appended claims.

Figure 2:
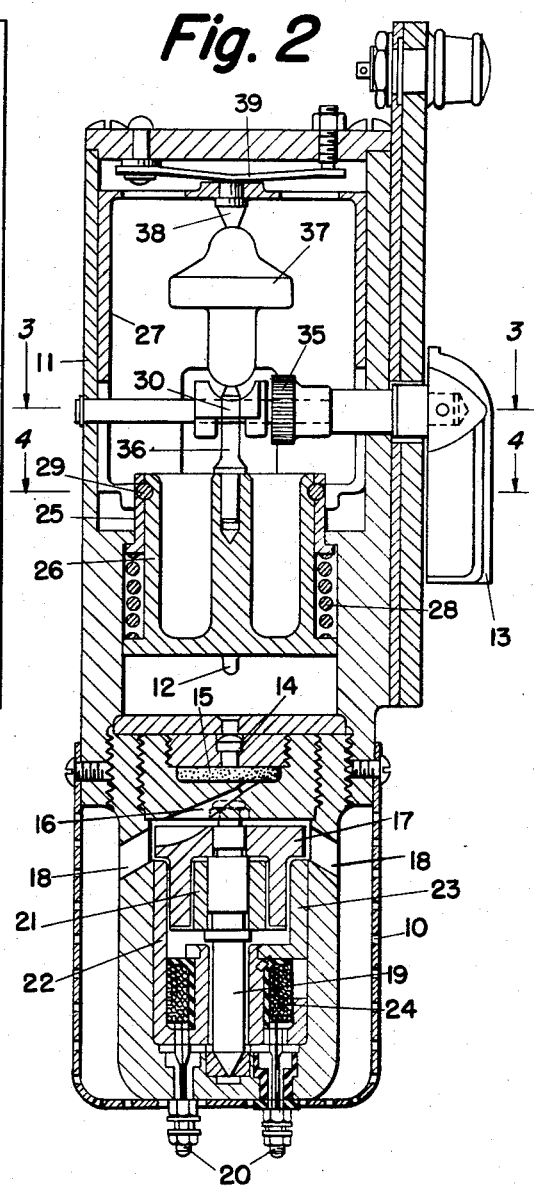
Figure 7:
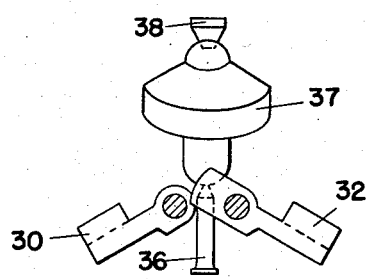
Figure 7A:
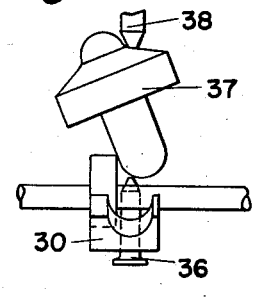
Figure 8:
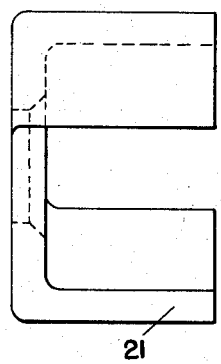
Figure 8A:
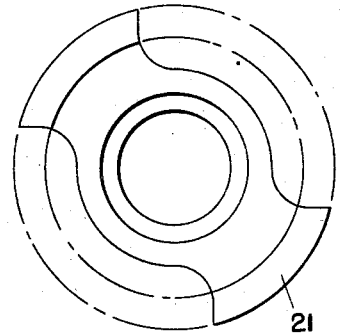
Figure 9A:
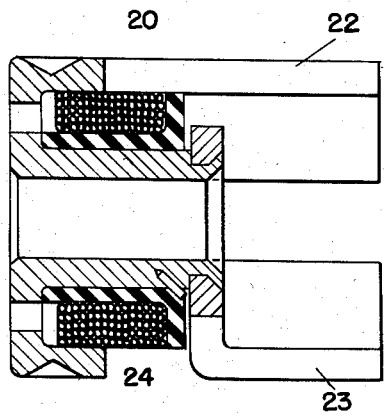
Figure 9:
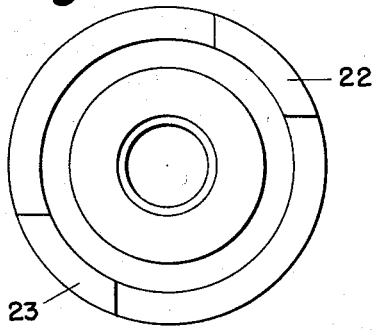

Referring to the drawings:

Fig. 1 is a front elevation of our deceleration sensing device and the electric generator which it controls, Fig. 2 is a section taken on the line 2—2 of Fig. 1, Fig. 3 is a section taken on the line 3—3 of Fig. 1, Fig. 4 is a partial section taken on the line 4—4 of Fig. 1, Fig. 5 and 5A are different views of the deceleration sensing device in its "safe" or inoperative position, Figs. 6 and 6A are different views of the deceleration sensing device as positioned for "automatic" operation, Figs. 7 and 7A illustrate the deceleration sensing device as arranged to permit manual operation of the means for initiating operation of the electric generator, Figs. 8 and 8A are different views of a magnet which is mounted on the generator shaft, and Figs. 9 and 9A are different views of the stationay field magnets and the coil in which voltage is induced as a result of the rotation of the magnet shown in Figs. 8 and 8A.

Figs. 1 and 2 illustrate a casing 10 which encloses an electric generator and is joined to a casing 11. The casing 11 encloses a deceleration sensing device which is adjustable to different conditions by means of a handle 13, and a firing pin 12 which is arranged to cooperate with a primer 14 for firing a charge 15.

The gas generated by the firing of the charge 15 is applied through angularly disposed openings 16 to the vanes of a turbine 17 which is provided with exhaust ports 18 and is fixed to a shaft 19 which drives an electric generator having output terminals 20.

This electric generator includes a rotatable alnico magnet 21, fixed field pole pieces 22 and 23 and an annular coil 24 which is interposed between the lower ends of the pole pieces 22 and 23 and in which voltage is induced as a result of rotation of the magnet 21 in juxtaposition to the stationary pole pieces 22 and 23.

The alnico magnet 21 is bipolar in form as indicated by Figs. 8 and 8A. The arrangement of the stationary pole pieces 22 and 23 and the annular coil 24 is indicated by Figs. 9 and 9A. It will be noted that, at any given time, the outer poles formed by the lower end of the pole piece 22 are of one polarity while the inner poles formed by the lower end of the pole piece 23 are of the opposite polarity. This condition of course changes as the magnet 21 is rotated by the turbine 17. As a result of this change in magnetic flux, voltage is induced in the coil 24 which is in the gap between the lower ends of the field pieces 22 and 23.

The operating mechanism of the firing pin 12 includes a fixed support 25, a movable support 26 and locking members 27 and 29. (See Figs. 1 and 4.) A spring 28 is interposed between the members 25 and 26.

With these various parts in their illustrated positions, the spring 28 is compressed and the firing pin 12 is in the position shown in Fig. 1. When the member 27 moves downwardly, however, the ball 29 is released from the groove near the upper end of member 26 and the firing pin 12 is driven by the spring 28 into engagement with the primer 14 thus firing the charge 15 and initiating operation of the electric generator.

The decelerating sensing device includes a member 30 (see Fig. 3) which is fixed to a shaft 31, and a member 32 which is fixed to a shaft 33. The shaft 33 is rotatable by the handle 13 and has fixed to it a gear 34 which is arranged to mesh with a gear 35 fixed to the shaft 31. The members 30 and 32 cooperate with members 36, 37, 38 and 39, for adjusting the deceleration sensing device to the three different conditions indicated in Fig. 1.

With the handle 13 in the "safe" position, the members 30 and 32 are positioned as shown in Figs. 5 and 5A and the firing pin 12 is locked in the position illustrated by Fig. 2.

With the handle 13 in the "Automatic" position indicated in Fig. 1, the members 30 and 32 are positioned as indicated by Figs. 6 and 6A. Assuming the members 30 and 32 to be in this position and to have been set for a deceleration rate of the order of 4 "g's," the energy stored in these members will move them to the position indicated by Figs. 7 and 7A in response to this rate of deceleration. As a result of this movement, the member 37 is toppled to one side by the extension of the member 32, the spring 39 pushes the member 27 downwardly so that the balls 29 are freed, and the spring 28 impacts the firing pin 12 against the primer 14.

With the member 37 in the position indicated by Figs. 7 and 7A and with the other parts of the deceleration sensing device in the positions indicated by Fig. 2, the device may be manually operated by exerting sufficient downward pressure on the member 27 to free the balls 29 and release the member 26.

The present invention thus provides an equipment wherein the operation of an electric generator is initiated by the firing of an explosive charge and wherein the firing of this charge may be made responsive to an abnormally high rate in the deceleration of the support on which the equipment is mounted.

We claim:

1. The combination of an electric generator supported by means subject to a varying rate of deceleration, means responsive to a predetermined rate of said deceleration to fire an explosive charge for generating a gas under pressure, and a turbine arranged to respond to said gas for driving said generator.

2. The combination of an electric generator supported by means subject to a varying rate of deceleration, means responsive to a predetermined rate of said deceleration to fire an explosive charge for generating a gas under pressure, means for manually operating said deceleration responsive means to fire said explosive charge, and a turbine arranged to respond to said gas for driving said generator.

3. The combination of an electric generator supported by means subject to a varying rate of deceleration, means responsive to a predetermined rate of said deceleration to fire an explosive charge for generating a gas under pressure, a turbine arranged to respond to said gas for driving said generator, and selector means operable to adjust said deceleration responsive means to a non-operable condition or to a condition for manual operation.

4. The combination of an electric generator having a support subject to a varying rate of deceleration an explosive cartridge, a spring, a firing pin, means for locking said firing pin in a position to compress said spring, means responsive to a predetermined rate of said deceleration for operating said locking means to release said firing pin and fire said cartridge and a turbine coupled to said generator and arranged to be driven by the gas generated by the firing of said cartridge.

5. The combination of an electric generator and an explosive cartridge supported by means subject to a varying rate of deceleration, a spring, a firing pin, means for locking said firing pin in a position to compress said spring, means responsive to a predetermined rate of said deceleration for operating said locking means to release said firing pin and fire said cartridge, means arranged to drive said generator in response to the gas pressure generated by the firing of said cartridge and means for locking said deceleration responsive means against response to said predetermined rate of deceleration.

6. The combination of an electric generator and an explosive cartridge supported by means subject to a varying rate of deceleration, a spring, a firing pin, means for locking said firing pin in a position to compress said spring, means responsive to a predetermined rate of said deceleration for operating said locking means to release said firing pin and fire said cartridge, means arranged to drive said generator in response to the gas pressure generated by the firing of said cartridge and means for adjusting said deceleration responsive means to a condition for manual operation.

References Cited in the file of this patent
UNITED STATES PATENTS

| | | |
|---|---|---|
| 1,549,763 | Greenwell | Aug. 18, 1925 |
| 1,709,590 | Myers | Apr. 16, 1929 |
| 1,943,706 | Varaud | Jan. 16, 1934 |
| 2,504,163 | Summerbell | April 18, 1950 |
| 2,642,543 | Teague | June 16, 1953 |
| 2,692,957 | Clark et al. | Oct. 26, 1954 |
| 2,695,365 | McLean | Nov. 23, 1954 |
| 2,701,527 | Granath et al. | Feb. 8, 1955 |